(12) United States Patent
Kagle et al.

(10) Patent No.: US 7,454,444 B2
(45) Date of Patent: *Nov. 18, 2008

(54) METHOD AND APPARATUS FOR SYNCHRONIZING MULTIPLE VERSIONS OF DIGITAL DATA

(75) Inventors: Jonathan C. Kagle, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/020,216

(22) Filed: Dec. 27, 2004

(65) Prior Publication Data

US 2005/0108280 A1    May 19, 2005

Related U.S. Application Data

(62) Division of application No. 09/809,058, filed on Mar. 16, 2001, now Pat. No. 7,216,289.

(51) Int. Cl.
*G06F 17/30* (2006.01)
*G06F 17/00* (2006.01)

(52) U.S. Cl. .................. 707/201; 707/200; 707/202
(58) Field of Classification Search .................. None
See application file for complete search history.

(56) References Cited

U.S. PATENT DOCUMENTS

| | | | |
|---|---|---|---|
| 5,335,320 A | 8/1994 | Iwata et al. | |
| 5,502,733 A | 3/1996 | Kishi et al. | |
| 5,519,865 A | 5/1996 | Kondo et al. | |
| 5,535,322 A | 7/1996 | Hecht | |
| 5,758,340 A | 5/1998 | Nail | |
| 5,781,635 A | 7/1998 | Chan | |
| 5,831,617 A | 11/1998 | Bhukhanwala | |
| 5,832,483 A | 11/1998 | Barker | |
| 5,874,955 A | 2/1999 | Rogowitz et al. | |
| 5,966,715 A | 10/1999 | Sweeney et al. | |
| 6,044,375 A | 3/2000 | Shmueli et al. | |
| 6,112,024 A | 8/2000 | Almond et al. | |
| 6,460,036 B1 * | 10/2002 | Herz | 707/10 |
| 7,016,869 B1 | 3/2006 | Haeberli | |
| 2002/0069218 A1 * | 6/2002 | Sull et al. | 707/501.1 |

OTHER PUBLICATIONS

"The Case for Non-transparent Replication: Examples from Bayou" by Douglas B. Terry et al., Computer Science Laboratory, Palo Alto, CA, pp. 1-9. Published prior to Mar. 2001.

(Continued)

*Primary Examiner*—Tony Mahmoudi
(74) *Attorney, Agent, or Firm*—Birch, Stewart, Kolasch & Birch, LLP (57) ABSTRACT

A method and system for synchronizing multiple versions of multimedia objects is provided. Each multimedia object may be identified by a unique identifier. In addition, a history graph may be generated and maintained for each object, where the history graph includes nodes that store unique identifiers and whose vectors describe the relationship between the multimedia objects. Metadata may be used to describe the transformations of objects.

17 Claims, 8 Drawing Sheets

Digital Image Evolution Example

OTHER PUBLICATIONS

"GUID Infrastructure Specification", Version 1.0.Oa1:1 by Jim Little, from Web site www.teleport.com/-sphere/documents/002c/1/index.html, pp. 1-4, Oct. 19, 2000.

"Flexible Update Propagation for Weakly Consistent Replication" by Karin Petersen, et al., Computer Science Laboratory, Palo Alto, CA, p. 1-27, from Web site www.parc.xerox.com/csl/projects/bayou/pubs/sosp-97/paper.html, published prior to Mar. 2001.

Exif Tag Info Viewer Ver 1.07, pp. 1-4, published prior to Mar. 2001, Web site members.xoom.com/__XMCM/bulldogking/index.htm.

"Description of Exif file format" by Mamoru Ohno, pp. 1-14, Web site www.butaman.ne.jp:8000/-tsuruzoh, published May 28, 1999.

"EXIFRead EXIF Information Reader" pp. 1-2, Web site http://members.tripod.com/-tawba/exifread.htm, Aug. 31, 1998.

* cited by examiner

METHOD AND APPARATUS FOR SYNCHRONIZING MULTIPLE VERSIONS OF DIGITAL DATA

CROSS-REFERENCE TO RELATED APPLICATIONS

This application is a divisional of prior U.S. application Ser. No. 09/809,058, filed Mar. 16, 2001, the entire contents of which are incorporated herein by reference.

TECHNICAL FIELD

The present invention relates to synchronizing multiple versions of multimedia objects by maintaining a history graph and descriptive metadata for the transition between points in the history graph. More particularly, the present invention is directed to a method and apparatus for synchronizing multiple versions of multimedia objects by assigning multimedia objects respective unique identifiers, and by creating a history graph having nodes that store unique identifiers and whose vectors describe the relationship between the multimedia objects.

BACKGROUND OF THE INVENTION

With the advent of networked computers, distributed computing, replicated data storage, mobile computing, and especially the use of multiple computing devices by a single user, there is a problem of managing multiple duplicates of the same object, such as a document or an image. For example, a user may take pictures using a digital camera and then transfer some of the pictures to a mobile computing device, such as a notebook PC. Later, some of the pictures may be transferred to a desktop PC, edited and added to a catalog. This process may be repeated with multiple pictures. In the process, the cataloging software may create thumbnail representations of some of the pictures. A few of the pictures may find their way to a Web site. At every stage, an image may be edited, reformatted, or combined with other images. If at some other time the user wants to consolidate the multiple, somewhat different copies of these pictures, the user is confronted with virtually an impossible task. That is because it is quite difficult to remember or track how those images relate to each other, and very difficult to analyze the differences between similar images, either automatically or by human intervention. If the user wants to maintain duplicate copies of the "image album" both on the home PC and mobile PC, and the user occasionally applies changes to either one, it is next to impossible to propagate those changes from one location to another. These difficulties also arise with respect to other multimedia objects such as audio and video data.

While tools exist to automatically synchronize versions of text documents, no such tools are available for other multimedia object comparison and merging. In addition, the nature of multimedia objects such as image data is much more complicated than pure text, making the problem much more complex to solve.

There are cameras available that save the filename as picture 0004, the fourth picture taken in the history of this camera, and the next image will be saved as picture 0005, so there is some level of a unique identifier. However, these identifiers are not unique to all the cameras in the world. For every such camera, the fourth picture taken will be saved as picture 0004.

Therefore, there is a need for a method and apparatus for synchronizing multiple versions of multimedia objects by assigning multimedia objects unique identifiers, respectively, and creating a history graph having nodes that store unique identifiers and whose vectors describe the relationship between the multimedia objects. In addition, there is also a need for a method and apparatus for synchronizing multiple versions of multimedia objects by adding metadata associated with each unique identifier describing the transformations applied to the corresponding multimedia object.

SUMMARY OF THE INVENTION

The present invention solves the foregoing deficiencies of the prior art by providing a quick, manageable method and system for synchronizing multiple versions of multimedia objects. More particularly, according to an aspect of the present invention each multimedia object may be identified by a unique identifier, rather than according to their location in a database or a file system. The use of unique identifiers allows synchronization of individual objects and reduces overhead in each system. In addition, a history graph is generated and maintained for each object, where the history graph includes nodes that store unique identifiers and whose vectors describe the relationship between the multimedia objects. Metadata may be used to describe the transformations of object. Using metadata to describe the transformations of an object and not physical data changes works more efficiently for multimedia data.

Prior systems required an application specific conflict detection mechanism to determine whether two things were done at the same time in which case there would be a conflict. According to an aspect of the present invention, a substantially unified system is provided by embedding the history graphs and metadata in the actual objects or by maintaining the history graphs in another location, there may be a unified way anyone can tell what manipulations have been performed on the object.

According to an aspect of the present invention, when an object is created, duplicated, moved to a new location, or modified in any way including creating an object by combining multimedia objects, the resulting object is assigned a new identifier. In addition, the unique identifier for each object may be maintained when the object is transferred or edited to facilitate tracking the path of the object.

DETAILED DESCRIPTION OF THE INVENTION

In order to facilitate the description of the present invention, the invention will be described with respect to the particular example of synchronizing images. The present invention, however, is not limited to any particular multimedia object or limited by the examples described herein. Therefore, the description of the embodiment that follows is for purposes of illustration and not limitation.

Figure 1:
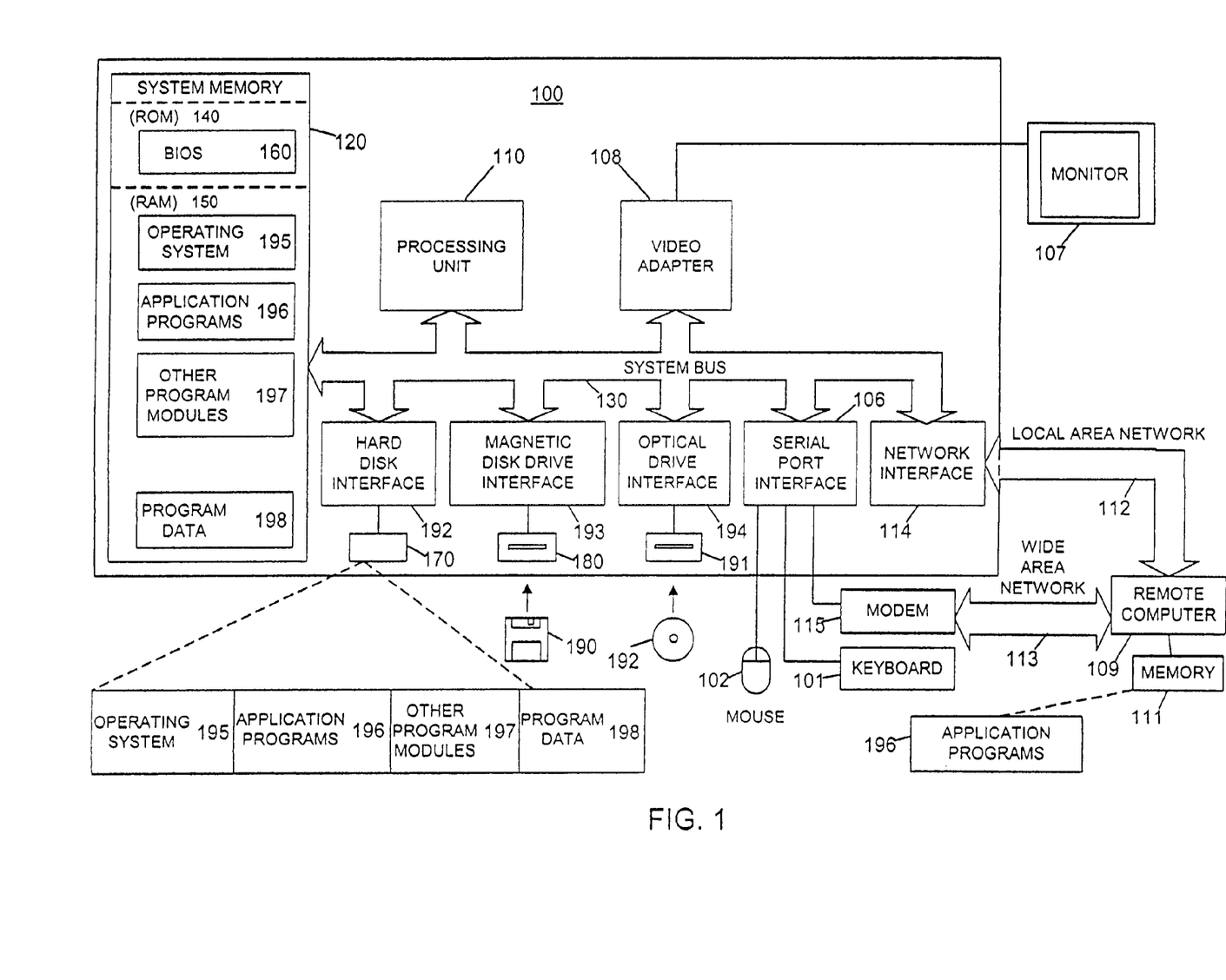
FIG. 1 a block diagram of a general-purpose digital computing environment that may be used to implement various aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above-systems or devices, and the like.

The invention may be described in the general context of computer-executable instructions, such as program modules, being executed by a computer. Generally, program modules include routines, programs, objects, components, data structures, etc. that may perform particular tasks or implement particular abstract data types. The invention may also be practiced in distributed computing environments where tasks are preformed by remote processing devices that are linked through a communications network. In a distributed computing environment, program modules may be located in both local and remote computer storage media including memory storage devices.

FIG. 1 is a schematic diagram of an exemplary conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other techniques for establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

As noted above, although the description of the invention refers to digital images, it is to be understood that the invention may be used to synchronize versions of other forms of digital data such as emails, slide presentations, schematics, operating system executables, audio, video, etc. The present invention provides a quick, manageable solution to synchronizing versions of objects by maintaining a history graph and descriptive metadata for the transition between points on the history graph.

In today's digital world, many images are obtained with digital cameras. Often, users find that they have acquired many images or pictures that are similar. This usually occurs because the original picture is modified and/or edited in various ways. For example, the proliferation of an image may begin when the user sends the image out to different recipient over the Internet. Many users enjoy sharing pictures with friends and relatives by sending them over the Internet. Recipients may manipulate the pictures by cropping, editing, etc. The image may then be returned to the user. This usually results in the user having an original and one or more variants of the original.

At some point, the user may wish to consolidate the images he has accumulated. However, this often proves to be a difficult task as it is often nearly impossible to determine how one image differs from another. More particularly, it is almost impossible to determine when the image corresponds to a previous image processed for red-eye reduction or processed for lower resolution, or processed with one of the many other manipulations that can be done to pictures by various products such as Picture It!® by Microsoft®. While computer analysis technology exists for comparing textual documents and determining the differences in the documents, no such technology exists for comparing other multimedia objects, such as images, and determining how similar images are different from each other. Ultimately, users usually end up saving all of the pictures because the user cannot determine which one is better or which one to save.

According to an aspect of the present invention, a quick, manageable solution to the synchronization problem is provided by maintaining, for each image, a history graph and descriptive metadata for the transition between points on the history graph. According to the present invention, a unique identifier may be assigned to each digital image. In addition, a history graph may be created and maintained for each image. The history graph includes nodes that store unique image identifiers, and vectors that describe the relationship between images. Each vector may have associated metadata describing the transformation from one node to the other.

Upon creation of an image (e.g., image capture by digital camera) or when receiving an image that has not been managed (i.e., from a legacy device), a unique identifier is assigned to the image. In addition, a unique identifier may be generated every time a modification is made to the image. The unique identifier may be generated by any known method, including implicit derivation from image data through methods such as hashing or cyclic redundancy checking (CRC). More particularly, when an image is created, duplicated, moved to a new location, or modified in any way including creating an image by combining other images, the resulting image is assigned a unique identifier. In order to facilitate tracking the image path, the unique identifier is not deleted or modified when the image is transferred or edited. The unique identifier may be a Global Unique Identifier (GUID). GUIDs are usually easy to generate and large enough to support unique identifiers. The unique identifier may be used in combination with the camera serial number and/or manufacturing code like UPC. Depending upon the specifics of the implementation of the invention on a particular device, the unique identifier may either be stored with the image (e.g., file system that supports extended file attributes, image file format that supports association of metadata with the image such as EXIF: Exchangeable Image File Format), or in a separate database. In the later case, a pointer to the location of the image may be stored together with the unique identifier.

According to the present invention, metadata may be associated with each unique identifier. The metadata describes the way in which the new image differs from the image(s) from which it was created. Metadata usually includes time of creation and location of the object, such as an image. It may also include a description of the transformation used to derive this image from its predecessor. For example, an image that was modified for display on a TV monitor from a Desktop PC may have the following metadata: Location Pictures/For TV/Vacation; Time Jul. 9, 2001 Brightness +7; Size 1280×960≧640×480. Additional data beyond identifier and date/time stamp depends on the media. For example, if the object is an image, the user may have the resolution of the image as an example of metadata. This may be generated by the application that was used to create the change. Copying a file will usually not be an operation that would be stored in metadata because it does not result in the manipulation of the data. If the user sends an image to a person via email, the recipient may modify the image and put the image on the Web. The user may then find the image on the Web and determine what changes were made to the image. More particularly, the user may compare the metadata for the image to determine whether the image put on the Web is the image received.

Figure 2:
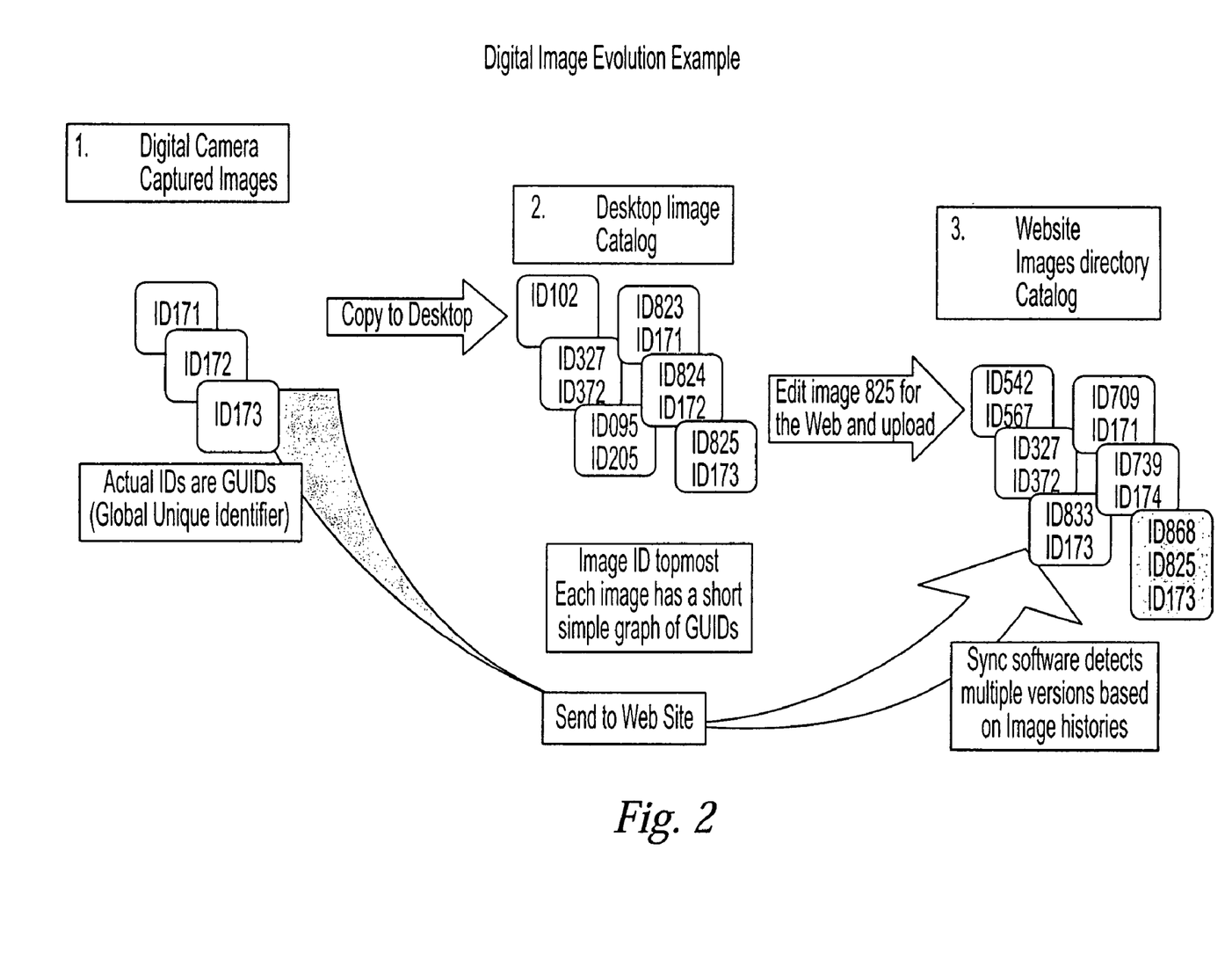
FIG. 2 illustrates an example of the evolution of a digital image.

In addition to metadata, a history graph having nodes corresponding to the unique identifiers may provide a complete description of the evolution of the image. Metadata may be associated with each vector describing the transformation of the image from one node in the history graph to another. Thus, the relationship between two images may be determined by observing their unique identifiers and history graphs. For example, two images may be considered identical when they have the same unique identifiers, while two images may be related when their history graphs intersect. An example of image evolution is shown in FIG. 2.

According to an aspect of the invention, the history graph for an image may be truncated to save storage space. More particularly, portions of the history graph may be stored with each image, or the history graphs may be stored in a central location. More particularly, partial history graph and metadata, describing recent history, may be transferred with the image. In other instances, only the partial history graph of recent changes may be transferred. The operating system may determine whether to truncate the history graph/metadata. The system may also be arranged to truncate the history graph/metadata based upon user input.

The history graph may be stored with the image or in a central location. For example, if the user is designing an image with a program such as Picture It!® by Microsoft®, it may be more efficient to only deal with pictures that have been imported into Picture It!® and modified with Picture It!®. In that case, the user may want a central directory. Central directories are usually faster to search. On the other hand, if the user plans on sending images to photo processing sites and posting pictures to Web sites, the user may want to store information with the picture.

In addition, the history graph may be stored both with the image and in a central location. The duplication of information may prevent the requirement of having to search graphs and compare data. In this case, there is a duplicate in each of the user's applications. In another arrangement, a central service may be used. If a central service is used, then an Application Programming Interface (API) that other programs use whenever they retrieve or store digital data may be needed to interface to the central service.

Each device that employs the synchronization method according to the present invention includes a program that manages image storage and synchronization. The program is usually part of the Operating System (OS) of the device, in the form of a system service or integrated into the device's file system or other storage system. The program that implements the method works in coordination with other software that manipulates digital images. The other software includes copy, transmit, image editing, synchronization and other programs. The program according to the present invention may provide an API to retrieve or store digital images. Because of the uniqueness of the identifiers associated with the images, the history graph and metadata may be stored separately from the images. In addition, multiple related images may share a single history graph.

In another implementation, the program that implements the method according to the present invention may be integrated with the OS services such that other software that manipulates digital images does not have to coordinate with it explicitly. Rather, the OS takes care of creating and associating the unique identifiers with the multiple digital images. In such a case, the OS API that handles data storage and retrieval may be equipped to receive the metadata associated with each new image. Usually, that is achieved by usage of file formats that embed the metadata inside of the image file.

The history graph and metadata of an image may be used for many purposes in addition to version synchronization. For example, an image's history may be examined by an editing tool to determine whether the image has had representations that may not be compatible with its new representation. More particularly, an image may be transferred from a Desktop PC to a mobile computing device such as personal digital assistant (PDA). Since mobile computing devices often have a much lower screen resolution than the Desktop PC, and also less storage space, it makes sense to create a lower resolution version of the image to be stored on such mobile computing devices. Later, the user of the mobile computing device may attempt to edit the image. The editing tool may examine the history of the image and inform the user that a copy of the image exists on their Desktop PC and that the changes applied to the image on the mobile computing device may not be transferable back to the copy residing on the Desktop PC. Alternatively, a merge tool may be able to understand the type of change and apply it to the other copy of the image (e.g., removing blemish at a specified location of the image).

As an example, a user may find a situation where an image is received and the user already has a catalog and wants to know whether this image already exists. This information may be obtained by reviewing the change history in the history graph that is received together with the image and trying to find whether any of the nodes of the graph correspond to information in the user's history graph. If it does, then the user can determine whether to add this image or to throw it out.

More particularly, suppose the user obtains a JPEG image off of the Internet, and it has a unique identifier and some time/date stamp and maybe resolution. Then the user puts the image into a program such as Microsoft's Picture It!®. The first thing that the program may do is convert the image to its own format. For the purposes of this discussion, assume that the moment that the program creates the image internally in its own format, the program creates a new graph for the image and adds to the history of the changes for that image the fact that it was converted from JPEG into a particular format. A unique identifier and metadata may be generated to indicate how the image data was transformed. Other manipulations may be performed on the image. For example, the image may be cropped, the contrast or balance may be adjusted. These changes may be represented as global changes to the image. When the image is saved, all of the information for the format of the image with the metadata and the new grid and probably the previous incarnation of the image may be saved. Therefore, the GUID of the parent image may be stored. Suppose that the user takes the image and converts it back to the JPEG format. At this point, a new GUID will be generated and the information that the image was converted from a particular format to JPEG will be added. At some point, the user may post the image on the Web. The user who posted the image on the Web originally may later pick this image up and immediately determine that this image was derived from their original image. This is because somewhere in the list of GUIDs is the GUID that the original use had. Then the user can actually determine what happened to the image later by referring to the metadata.

Figure 3:
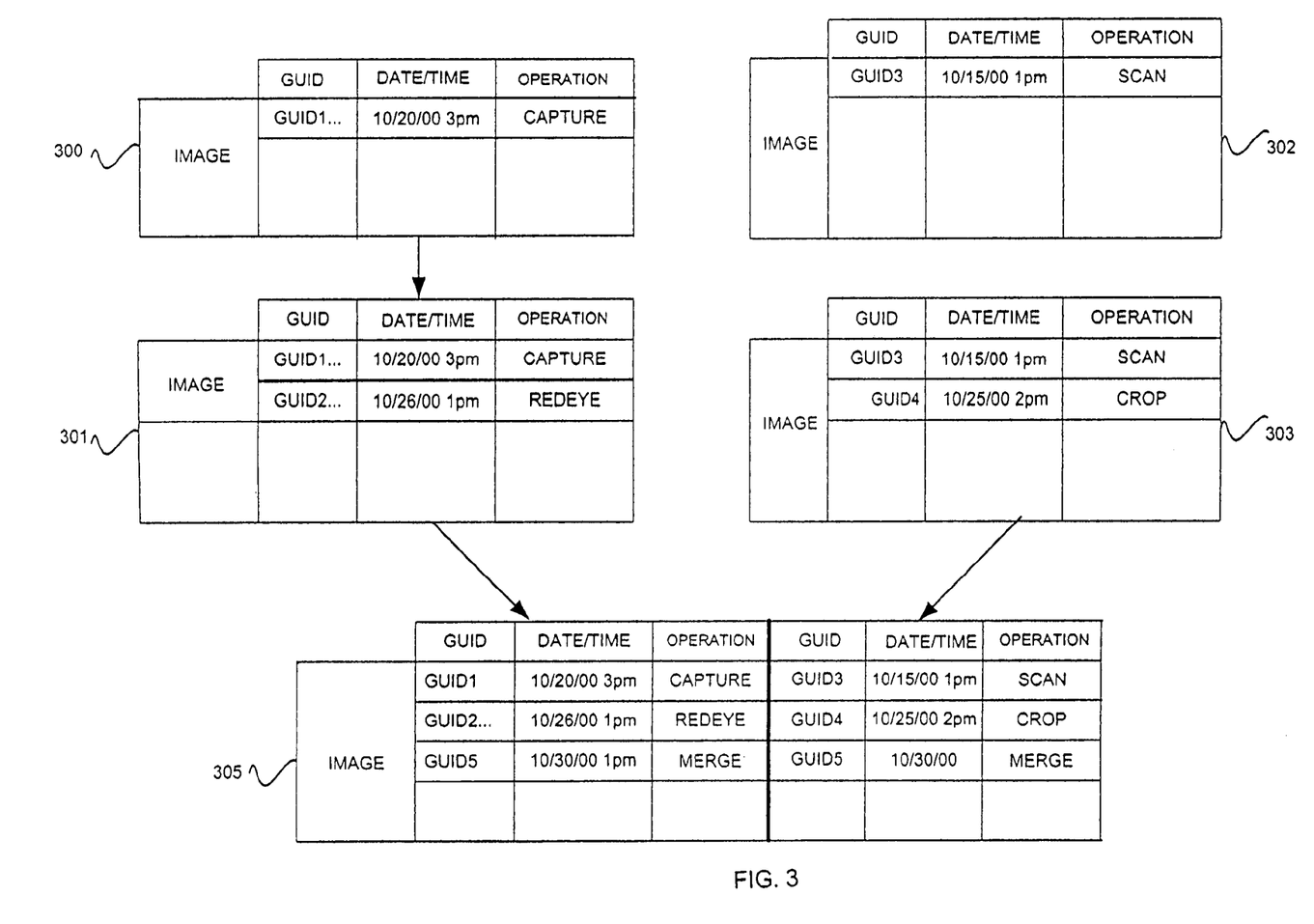
FIG. 3 illustrates an example of manipulating images and updating information according to an aspect of the present invention.
Figure 4:
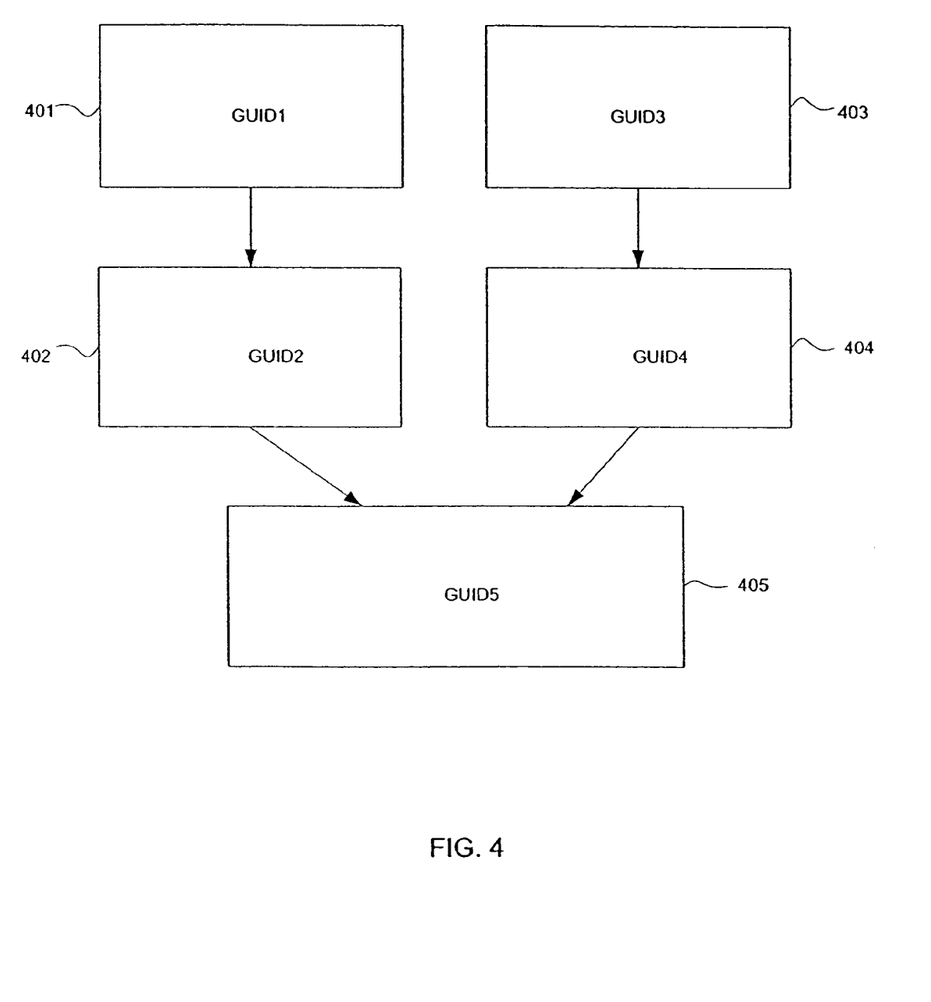
FIG. 4 illustrates a history graph for the manipulations performed in FIG. 3.

A specific example will be described with reference to FIGS. 3 and 4. In FIG. 3, the processing evolution of an image is shown. The image having GUID1 may be processed for red eye to arrive at the image 301 having GUID2. In addition, the image 302 having GUID3 may be cropped to arrive at the image 303 having GUID4. Finally, the images with GUID2 and GUID4 may be combined to form an image 305 with GUID5. The history graph corresponding to this image processing is shown in FIG. 4. Items 401 through 405 illustrate that, in this example, GUID5 is derived from images having Ids GUID2 and GUID4, which are further derived from images having GUID1 and GUID4, which are further derived from images having GUID1 and GUID3, respectively. The evolution of the image with GUID5 may be determined from the history graph shown in FIG. 4. The history graph shown in FIG. 4 and the metadata may be transferred together with the image having GUID5 so that the recipient may determine the evolution of the image. The history graph and metadata for an image are not visible upon display. However, a program may read the information in the file and use it.

Figure 5A:
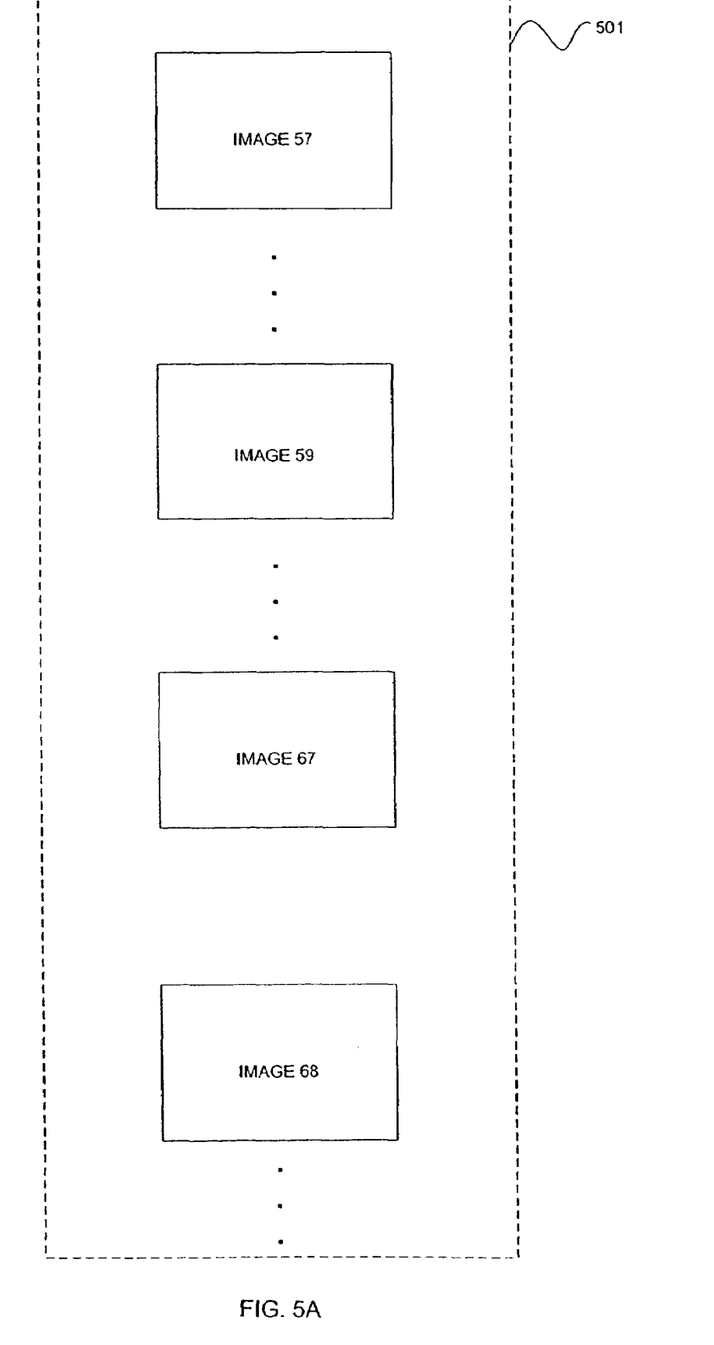
FIGS. 5A-5D illustrate stored images and associated history graphs, respectively, in accordance with an aspect of the invention.
Figure 5B:
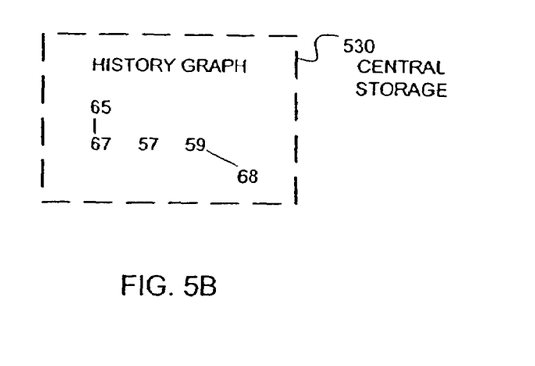
Figure 5C:
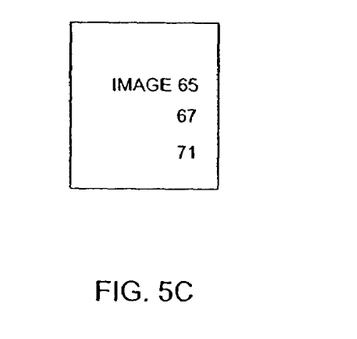
Figure 5D:
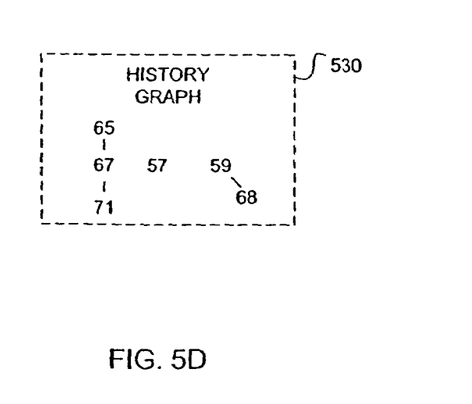

Another example is illustrated in FIGS. 5A-5D. In this example, the history graph may be stored in a central storage 530. The metadata may be stored separately from the history graph. In this case, the identifier coordinates the information. Images are already stored and they are identified by numbers 57, . . . , etc., as shown in FIG. 5A. The history graph indicates that image 68 was derived from image 59, as well as illustrating other details. Referring to FIG. 5C, assume that a new image is received and it has the following information: identifier 71 and short history that indicates that it was derived from image 67 and that image 67 was derived from image 65. In this arrangement, the image arrives and the system services determine where it fits with respect to other stored images. It performs this operation by looking for the identifier numbers in the history graphs stored in the central storage 530. Once it is determined where the image fits with respect to other stored images, the history graph is updated to include the image, as shown in FIG. 5D. All of the other information for the image may be removed and stored in another location. The actual stored image is different from the received image in the sense that the metadata changed based on change in history. The identifier may be used to find the data in other storage locations.

Figure 6:
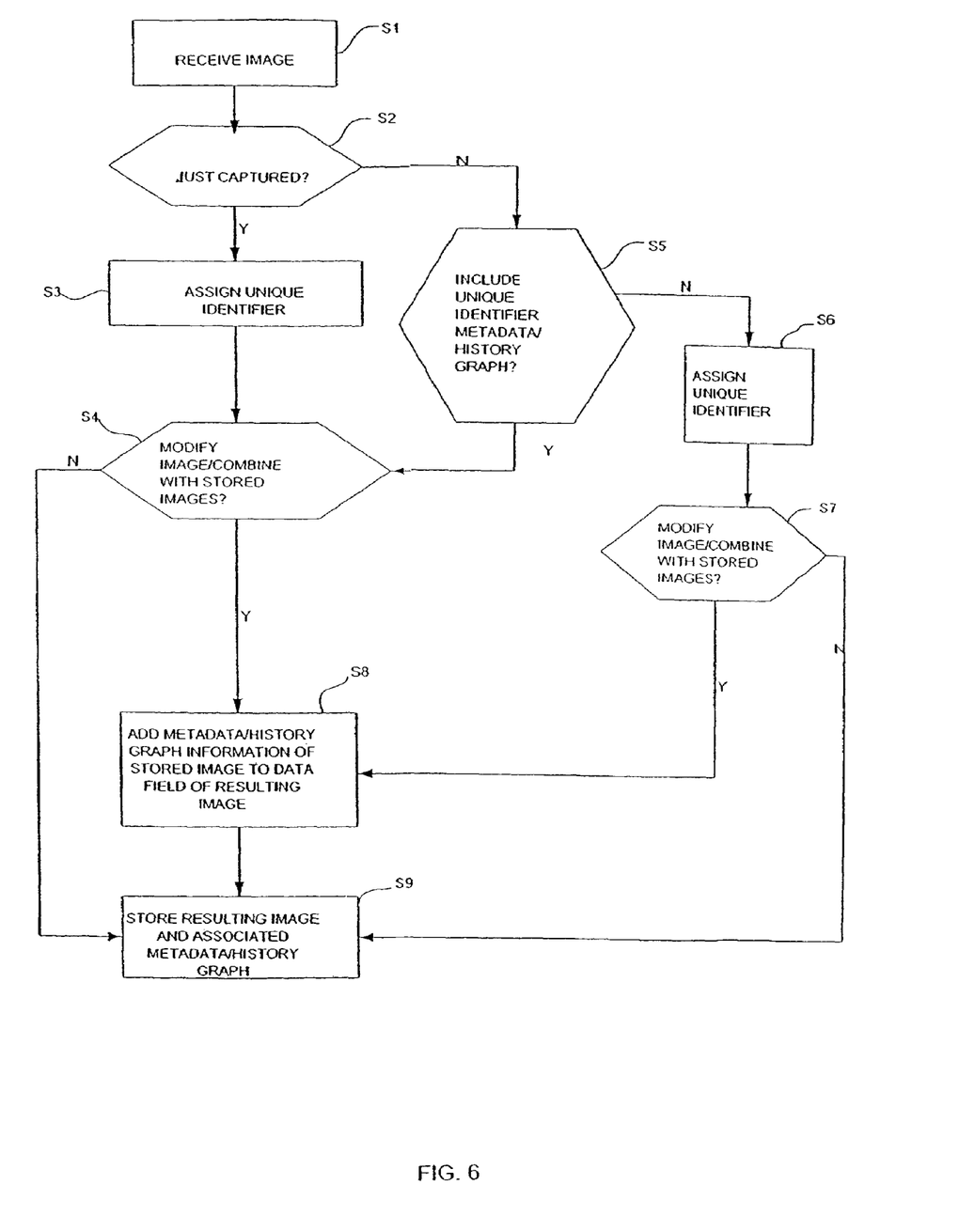
FIG. 6 illustrates a flowchart for processing an image according to an aspect of the invention.

FIG. 6 illustrates processing upon receipt of an image according to an aspect of the present invention. In step S1, an image is received. In step S2, it is determined whether the image was just captured or whether it was received from another source. If the answer in step S2 is Yes, then step S3 is performed and a unique identifier is generated for the image. If the answer in step S2 is No, then step S5 is performed to determine whether the image has an associated unique identifier, metadata, and/or history graph. If the answer in step S5 is Yes, the processing proceeds to step S4. If the answer in step S5 is No, then a unique identifier is assigned to the image in step S6. In step S4, it is determined whether the received image was modified/combined with stored image(s) after being received. If the answer in step S4 is Yes, then, appropriate metadata describing the transformations or manipulations performed on the received image is added to the data field and a history graph is created for the image in step S8. Finally, the resulting image and the metadata/history graph are stored in step S9. If the answer in step S4 is No, then processing proceeds to step S9 and the image is stored together with its unique identifier. Once a unique identifier has been assigned in step S6, step S7 is performed to determine whether the received image was modified/combined with stored image(s) after being received. If the answer in step S7 is Yes, then, appropriate metadata describing the transformations or manipulations performed on the received image is added to the data field and the history graph for the image is updated in step S8. The resulting image and the metadata/history graph are then stored in step S9.

Figure 7:
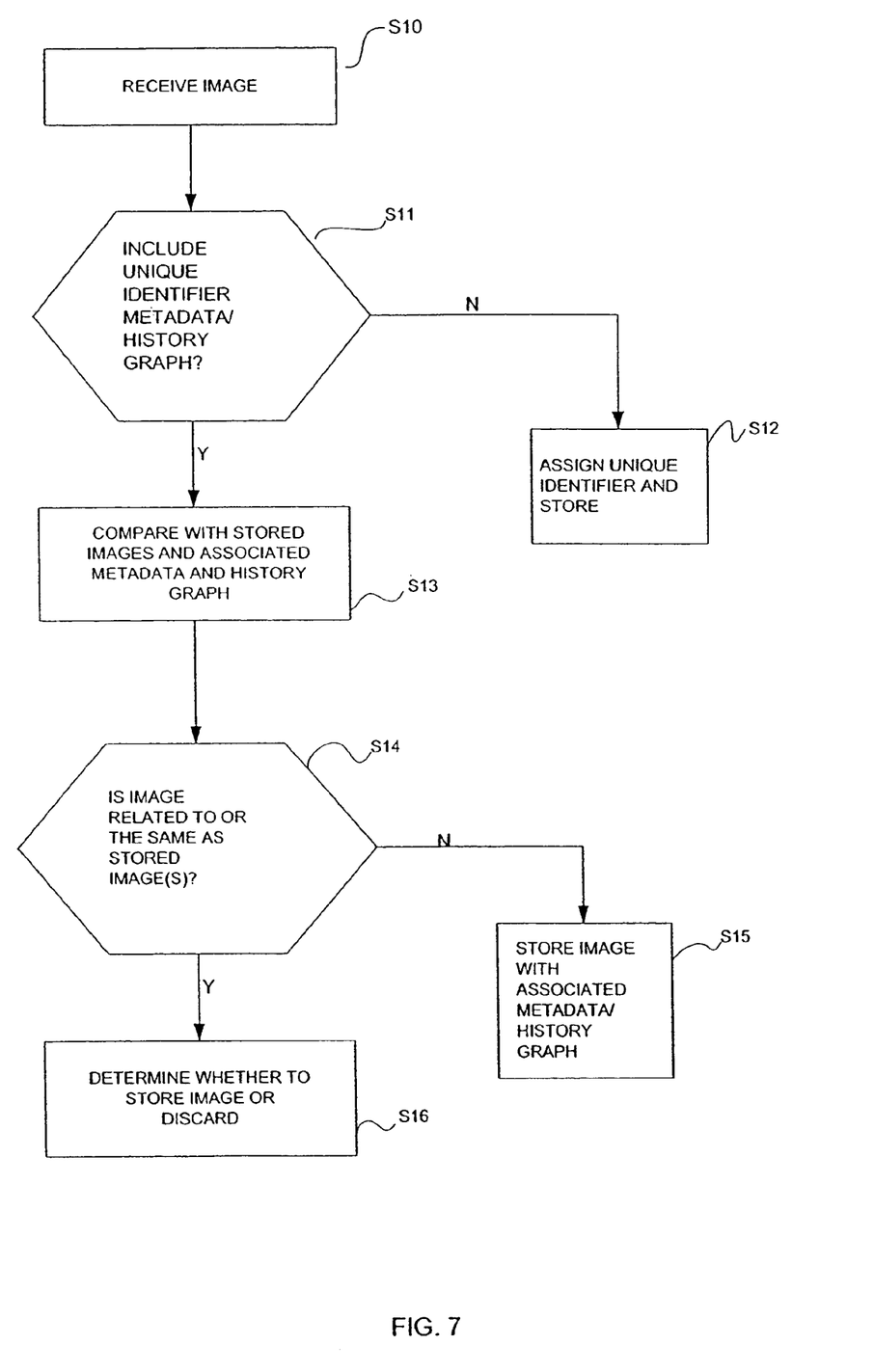
FIG. 7 illustrates a flowchart for determining whether a received image relates to a stored image(s), according to another aspect of the present invention.

Referring to FIG. 7, a process for determining whether a received image corresponds to a stored image is illustrated according to an aspect of the present invention. In step S10, an image is received. In step S11, it is determined whether the image includes a unique identifier, metadata and history graph. If the answer in step S11 is Yes, then processing continues to step S13. If the answer in step S11 is No, then a unique identifier is assigned to the image and the image may be stored in step S12. In step S13, the unique identifier, metadata and history graph information are used to determine whether the received image corresponds to or is related to any of the stored images. In step S14, it is determined whether the comparison in step S13 has discovered an image that is related to or the same as a stored image. If the answer in step S14 is Yes, then processing continues to step S16, where it is determined whether or not the user wishes to store the image or discard it. If the answer in step S14 is No, then the image may be stored with the associated metadata and history graph information in step S15.

As demonstrated by the foregoing, the present invention provides a quick, manageable method and system for synchronizing multiple versions of multimedia objects. More particularly, according to an aspect of the present invention each multimedia object may be identified by a unique identifier. The use of unique identifiers allows synchronization of individual objects and reduces overhead in each system. In addition, a history graph may be generated and maintained for each object, where the history graph includes nodes that store unique identifiers and whose vectors describe the relationship between the multimedia objects. Metadata may be used to describe the transformations of object.

While particular embodiments of the invention have been shown and described, it is recognized that various modifications thereof will occur to those skilled in the art without departing from the spirit and scope of the invention. More particularly, it will be appreciated by those of ordinary skill in the art that the present application may be useful in many applications. For example, the invention may be implemented in an image cataloging system or in a system for tracking multimedia properties of objects. The described embodiments are to be considered in all respects only as illustrative and not restrictive. Therefore, the scope of the herein-described invention shall be limited solely by the claims appended hereto.

What is claimed is:

1. A method for synchronizing multiple versions of an object, comprising:
   receiving a multimedia object;
   assigning the multimedia object a first unique identifier and history data if the multimedia object does not have an associated unique identifier and history data, the first unique identifier being associated with metadata describing at least one attribute of the multimedia object, and the history data includes a first node representing the first unique identifier;
   responsive to the multimedia object being modified,
   assigning the multimedia object a second unique identifier, the second unique identifier being associated with metadata describing at least the modification of the multimedia object, said modification representing a change that has been made to the data of the multimedia object, and
   updating the history data to include a second node representing the second unique identifier of the multimedia object and to associate the second node with the first node;
   storing the multimedia object and the updated history data.

2. The method of claim 1, wherein the history data comprises a history graph of the associations between the nodes.

3. The method of claim 1, wherein at least one of the first and second unique identifiers are stored with the multimedia object.

4. The method of claim 1, wherein at least a portion of the history data is stored with the multimedia object.

5. The method of claim 1, wherein at least a portion of the history data is stored in a database.

6. The method of claim 1, wherein the first and second unique identifiers are Global Unique Identifiers (GUIDs).

7. The method of claim 2, wherein the first and second nodes in the history graph are associated by a vector, and wherein said vector is associated with metadata describing the transformation of the multimedia object from a state associated with the first node to a state associated with the second node.

8. The method of claim 1, wherein the first and second multimedia objects comprise first and second digital images, respectively, and wherein the metadata associated with the second unique identifier describes how the first digital image has been transformed or manipulated to produce the second digital image.

9. The method of claim 8, wherein at least one the first unique identifier is used with a serial number or manufacture code of a camera which acquired the digital image.

10. The method of claim 1, wherein the metadata describing the modification of the multimedia object describes at least one of a transformation of the multimedia object from a previous version of the multimedia object, a manipulation that has changed the content of the data of the multimedia object, or specific image processing which was previously applied to the multimedia object.

11. A method of comparing multimedia objects comprising:
   receiving a first multimedia object;
   assigning the first multimedia object a unique identifier and history data including at least one node representing the unique identifier if the multimedia object is not associated with at least one unique identifier and history data;
   comparing the first multimedia object to at least one second multimedia object by ascertaining whether at least one unique identifier of the first multimedia object matches at least one unique identifier of the second multimedia object, or by determining whether the history data of the first multimedia object shares any nodes in common with history data of the second multimedia object, the unique identifiers of the first multimedia object and the second multimedia object each being associated with respective metadata describing at least a modification of each of the multimedia objects, said modification representing a change that has been made to the data of the multimedia objects;

determining whether the first multimedia object is related to the at least one second multimedia object based on the results of said comparison; and either performing a predetermined action on the basis of whether the first and at least one second multimedia objects are determined to be related, or outputting the result of said determination to a user.

12. The method according to claim 11, wherein the predetermined action comprises storing or discarding the first multimedia object based on whether the multimedia object is related to the at least one second multimedia object.

13. The method according to claim 12, wherein when the multimedia object is related to the at least one second multimedia object the storing or discarding being further based on how the first multimedia object is related to the at least one stored multimedia object.

14. A computer readable medium having computer executable instructions stored for performing the method of claim 11.

15. The method of claim 11, wherein the history data comprises a history graph of the associations between the nodes.

16. The method of claim 11, wherein comparing the first multimedia object and the at least one second multimedia object comprises determining where the respective history graphs of the first multimedia object and at least one second multimedia object intersect or overlap.

17. The method of claim 11, wherein the metadata describing the modification of the multimedia object describes at least one of a transformation of the multimedia object from a previous version of the multimedia object, a manipulation that has changed the content of the data of the multimedia object, or specific image processing which was previously applied to the multimedia object.

* * * * *

UNITED STATES PATENT AND TRADEMARK OFFICE
CERTIFICATE OF CORRECTION

PATENT NO. : 7,454,444 B2  
APPLICATION NO. : 11/020216  
DATED : November 18, 2008  
INVENTOR(S) : Jonathan C. Kagle et al.

Page 1 of 1

It is certified that error appears in the above-identified patent and that said Letters Patent is hereby corrected as shown below:

In column 12, line 1, in Claim 13, after "media object" insert -- , --.

Signed and Sealed this

Twenty-sixth Day of April, 2011

David J. Kappos
*Director of the United States Patent and Trademark Office*